Sept. 1, 1959     M. L. PINKERTON ET AL     2,901,858

FISH HOOK HOLDER

Filed Feb. 11, 1958

Milburn L. Pinkerton
Martin L. Pinkerton
              INVENTORS

United States Patent Office 2,901,858
Patented Sept. 1, 1959

2,901,858

FISH HOOK HOLDER

Milburn L. Pinkerton and Martin L. Pinkerton,
Junction, Tex.

Application February 11, 1958, Serial No. 714,515

2 Claims. (Cl. 43—57.5)

The present invention relates to a simple, practical and compact holder and carrier for a plurality of conventional fish hooks and lures of different sizes.

The obvious object is to provide an efficient two-part casing functioning as a suitable holder by way of which a user may carry fish hooks in an orderly manner and so that they will not become entangled with each other, the construction of the sections or parts of the casing being such that the user, following a dialing procedure, can readily and selectively insert and remove fish hooks in a manner which facilitates greatly the steps involved in setting out lines such as trout lines, throw lines, and trotlines.

Another object of the invention is to improve upon similarly constructed and performing multiple fish hook holding and carrying devices such as, for example, the Bleckman trotline holder in Patent 2,708,326.

In carrying out the invention the casing or container is preferably constructed from complemental plastic or equivalent lightweight durable half sections which are pivotally connected together so that one section may be rotated relative to the other section so as to deliver a needed fish hook in line with a discharge slot in the cover section in a manner to be hereinafter more specifically set forth.

Other objects, features and advantages will become more readily apparent from the following description and the accompanying drawings.

Figure 1:
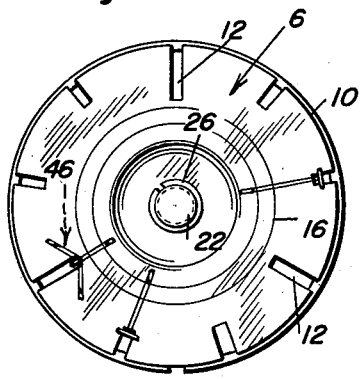
Fig. 1 is a bottom plan view of a fish hook holder and carrier embodying the improvements under advisement.
Figure 2:
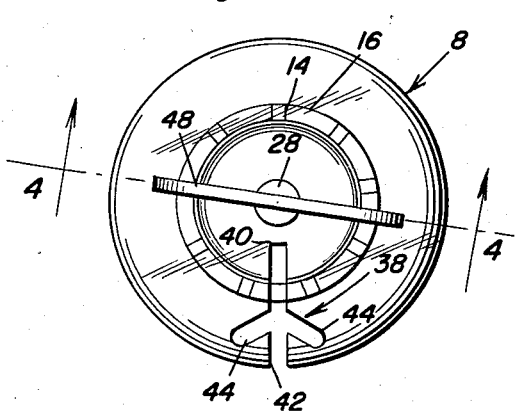
Fig. 2 is a top plan view of the same with none of the fish hooks shown.
Figure 3:
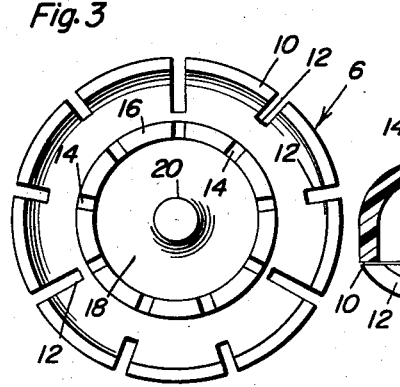
Fig. 3 is a top plan view of the bottom or base section.
Figure 5:
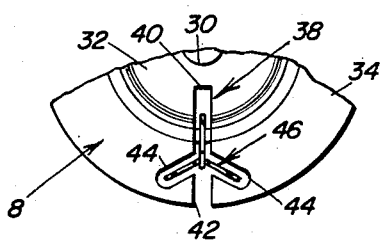
Fig. 5 is a fragmentary plan view illustrating how the discharge slot functions for inserting and removing treble fish hooks.

The lower half section or base is denoted by the numeral 6 (Fig. 3) and the upper or cover section by the numeral 8. As seen in Fig. 3 the section 6 is generally circular in plan and the outer peripheral edge is formed into an upturned lip 10 and circumferentially spaced slots are provided at 12 and open at the outer ends through the lip. These slots 12 are aligned with keeper notches 14 formed in the upper edge of the upstanding wall or flange 16. The upwardly dished central portion 18 has a central opening therein at 20 to accommodate the lower end of the assembling and turning pin 22. The latter has a groove at the lower end 24 which extends through the opening 20 to accommodate an attachable and detachable split resilient clamping ring 26. The upper end is flanged to provide a head 28 which cooperates with the apertured central portion 30 at the dished center 32 of the annular plate portion 34 of the cover section. There is a depending marginal flange 36 which cooperates with the notched lip 10. Thus the two sections are disposed in superposed relationship and are separably pinned and rotatably joined so that they may function as a container or casing and also as easily usable dialing means for the sections. It will be noticed that the radial slots 12 vary in length (as seen in Fig. 3) to accommodate fish hooks of varying sizes. Also there is a single opening or discharge slot 38 in the cover section and this slot is substantially cruciform in shape as seen in Fig. 5. It has an inner end portion 40, an outer open end 42 and a pair of lateral branching slots 44. These together form a single cruciform slot which serves to accommodate the insertion and removal of regular single barbed hooks, or treble hooks with or without barbs. The treble hook is denoted at 46 and is conveniently shown for illustration purposes in Fig. 5. In other words when the treble hook has to be inserted or removed the prongs thereof are lined up with the several slots in the manner shown. Normally, however, the branch or side slots 44 are not needed for regularly employed single prong fish hooks.

The cover section 8 is preferably provided with a bail-like handle or hand-grip 48.

Figure 4:
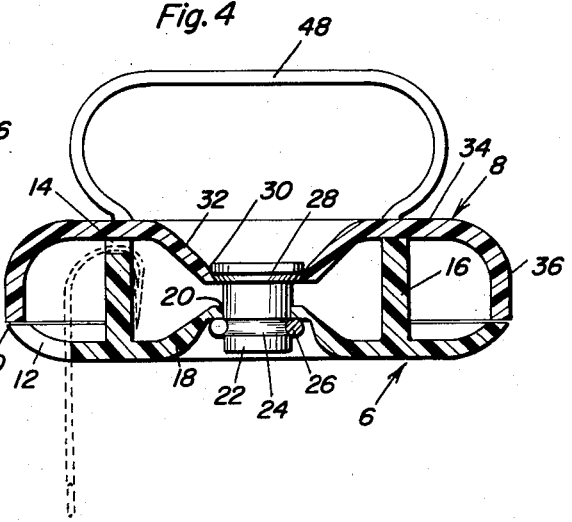
Fig. 4 is a view on the line 4—4 of Fig. 2, taken on a slightly enlarged scale.

With the construction shown any individual hook can be removed or placed in the container or casing at any time without disturbing any of the companion hooks. The invention is operated by holding the same with the extended ends or shank portions of the fish hooks with the shanks hanging down as shown in dotted lines in Fig. 4. By rotating the two sections 6 and 8 relative to each other in a dial-like manner with the aid, of course, of the handle 48, the user may handle the insertion and removal steps with systematic results.

It will thus be seen that the invention accomplishes its objects and while it has been herein disclosed by reference to the details of preferred embodiments it will be understood that such disclosure is intended as illustrative rather than limiting in sense. In fact, minor changes in shape, size and rearrangement of components coming within the field of the invention as claimed may be resorted to in actual practice without departing from the scope of the invention as claimed.

What is claimed as new is as follows:

1. A holder for a plurality of selectively insertable and removable fishhooks of different sizes comprising a base generally circular in plan and having an outer marginal lip and provided with a plurality of circumferentially spaced radial slots closed at their inner ends and opening at their outer ends through said lip, said base also having a centrally disposed opening, and being also provided between said central opening and lip with an upstanding endless flange, a cover similar in size and shape to the base and having a central opening alined with the first named opening and a depending marginal flange having movable contact with said lip, a headed pin passing removably through the alined openings and through and beyond the first named opening and being grooved and provided with a readily attachable and detachable split retaining ring, said cover having a cruciform slot adapted to facilitate insertion and removal of hooks when cooperable with the first named slots.

2. The structure defined in claim 1 and wherein the upper edge of said endless upstanding flange is provided with keeper notches alined with their respective radial slots, and said cover is provided with an accessibly convenient handle to facilitate handling of the base and cover when "dialing" to either insert or remove a given fishhook.

References Cited in the file of this patent

UNITED STATES PATENTS 2,708,326     Bleckman             May 17, 1955
2,763,957     Roberts               Sept. 25, 1956